(12) United States Patent
Hu et al.

(10) Patent No.: US 12,170,694 B2
(45) Date of Patent: Dec. 17, 2024

(54) DATA SHARING (71) Applicant: Nokia Technologies Oy, Espoo (FI)

(72) Inventors: Zhiyuan Hu, Shanghai (CN); Duan Chen, Shanghai (CN); Yueming Yin, Shanghai (CN); Zhigang Luo, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 459 days.

(21) Appl. No.: 17/414,667

(22) PCT Filed: Dec. 29, 2018

(86) PCT No.: PCT/CN2018/125333
§ 371 (c)(1),
(2) Date: Jun. 16, 2021

(87) PCT Pub. No.: WO2020/133346
PCT Pub. Date: Jul. 2, 2020

(65) Prior Publication Data
US 2022/0060514 A1  Feb. 24, 2022

(51) Int. Cl.
*H04L 29/06* (2006.01)
*G06F 21/62* (2013.01)
*H04L 9/40* (2022.01)

(52) U.S. Cl.
CPC .......... *H04L 63/20* (2013.01); *G06F 21/6245* (2013.01); *H04L 63/06* (2013.01)

(58) Field of Classification Search
CPC ....... H04L 63/20; H04L 63/06; H04L 9/0894; H04L 9/3213; H04L 9/3239; H04L 9/50;
(Continued)

(56) References Cited

U.S. PATENT DOCUMENTS 10,095,888 B1  10/2018  Lee et al.
10,963,582 B1 *  3/2021  McCown .............. G06F 21/602
(Continued)

FOREIGN PATENT DOCUMENTS

CN  106600405 A  4/2017
CN  107767265 A  3/2018
(Continued)

OTHER PUBLICATIONS

Hu, "DLT-based Data Access and Sharing Model for ITU-T X.das-mgt, Security Framework for the Data Access and Sharing Management System based on the Distributed Ledger Technology", SG17-COxxx, Study Group 17, Nokia Shanghai Bell, Jan. 22-30, 2019, pp. 1-13.
(Continued)

*Primary Examiner* — Jeffrey C Pwu
*Assistant Examiner* — Nega Woldemariam
(74) *Attorney, Agent, or Firm* — Lippes Mathias LLP (57) ABSTRACT

Embodiments of the present disclosure relate to devices, methods, apparatuses and computer readable storage media for data sharing. In example embodiments, a method for data sharing is provided. The method comprises, in response to receiving a first request to share data of a user from a data sharing agent, creating a data sharing smart contract for the user. The method further comprises publishing the data sharing smart contract to one or more data consumers. The method further comprises, in response to receiving a second request to access the data from a data consumer, generating, by executing the data sharing smart contract, an indication that the data consumer is authorized to access the data. In addition, the method further comprises sending the indication to the data consumer. In this way, end users are enabled to manage and share their personal data by themselves.

16 Claims, 7 Drawing Sheets

(58) Field of Classification Search
CPC ... H04L 63/061; H04L 63/0807; H04L 63/10; H04L 63/123; H04L 63/104; G06F 21/6245; G06F 21/31; G06F 21/604; G06F 21/6218; G06F 21/64
USPC .......................................................... 726/30
See application file for complete search history.

(56) References Cited

U.S. PATENT DOCUMENTS

| | | | |
|---|---|---|---|
| 2017/0300627 | A1 | 10/2017 | Giordano et al. |
| 2018/0144153 | A1 | 5/2018 | Pead |
| 2018/0182052 | A1 | 6/2018 | Panagos |
| 2022/0058285 | A1* | 2/2022 | Trenholm ............... G06F 16/27 |

FOREIGN PATENT DOCUMENTS

| | | |
|---|---|---|
| CN | 108171430 A | 6/2018 |
| CN | 108694331 A | 10/2018 |
| CN | 108768972 A | 11/2018 |
| CN | 108846653 A | 11/2018 |
| CN | 108881160 A | 11/2018 |
| CN | 108985089 A | 12/2018 |
| WO | 2017/223540 A1 | 12/2017 |
| WO | 2018/142272 A1 | 8/2018 |

OTHER PUBLICATIONS

"How Donald Trump Campaign used Data Scraped from Facebook to win Presidency", The Independent, Retrieved on Jun. 7, 2021, Webpage available at : https://www.independent.co.uk/news/world/americas/facebook-scandal-latest-donald-trump-campaign-presidential-election-cambridge-analytica-steve-bannon-a8269706.html.

"Facebook Says Data On 87 Million People May Have Been Shared In Cambridge Analytica Leak", Forbes, Retrieved on Jun. 7, 2021, Webpage available at : https://www.forbes.com/sites/kathleenchaykowski/2018/04/04/facebook-says-data-on-87-million-people-may-have-been-shared-in-cambridge-analytica-leak/#6307e30a3e8b.

"Reach Prospective Customers and Fans", Facebook, Retrieved on Jun. 10, 2021, Webpage available at : https://www.facebook.com/business/ads.

Zheng et al., "Blockchain-based Personal Health Data Sharing System Using Cloud Storage", IEEE 20th International Conference on e-Health Networking, Applications and Services (Healthcom), Sep. 17-20, 2018, 6 pages.

Zhou et al., "Distributed Data Vending on Blockchain", arXiv, Mar. 16, 2018, 10 pages.

Frece et al., "Tokenized Ecosystem of Personal Data—Exemplified on the Context of the Smart City", JeDem, vol. 9, No. 2, 2017, pp. 110.133.

"Distributed Ledgers: Shared Control, Not Shared Data", Bits on Blocks, Retrieved on Jun. 7, 2021, Webpage available at : https://bitsonblocks.net/2017/01/09/distributed-ledgers-shared-control-not-shared-data.

International Search Report and Written Opinion received for corresponding Patent Cooperation Treaty Application No. PCT/CN2018/125333, dated Jun. 28, 2019, 9 pages.

Extended European Search Report received for corresponding European Patent Application No. 18944576.0, dated Jun. 15, 2022, 11 pages.

* cited by examiner

DATA SHARING

RELATED APPLICATION

This application claims priority to PCT Application No. PCT/CN2018/125333, filed on Dec. 29, 2018, which is incorporated herein by reference in its entirety.

TECHNICAL FIELD

Embodiments of the present disclosure generally relate to the field of data management, and in particular, to devices, methods, apparatuses and computer readable storage media for data sharing.

BACKGROUND

Smart devices, such as smart phones, wearable devices, home appliances and the like, enable end users to access the Internet anytime and anywhere. With the help of smart devices, end users can access social media, shop online, get telemedicine services, control smart home appliances remotely and so on. In order to improve system performance and enhance user experience, some personal information of an end user (for example, user name, password, age, gender, fingerprints, telephone number, unique device identifier, location, credit card number, financial record, medical record and the like) may be collected, stored, used, maintained and/or disseminated by service providers with the authorization of the end user.

However, some service providers may collect additional personal information which is not related to the provided services, in order to do data mining and analysis in depth to enable other services for getting more profits. Moreover, some service providers may share the collected personal information with third parties without informing related end users. All of these might threaten privacy of the end users. On the other hand, the end users may want to manage and share their personal data by themselves. Therefore, it is important to provide a solution to enable law enforcement officers to detect whether service providers infringe privacy of end users and enable the end users to manage and share their personal data by themselves.

SUMMARY

In general, example embodiments of the present disclosure provide methods, devices, apparatuses and computer readable storage media for data sharing.

In a first aspect, there is provided a method for data sharing. The method comprises, in response to receiving a first request to share data of a user from a data sharing agent, creating a data sharing smart contract for the user, the data sharing smart contract indicating information on the sharing of the data. The method further comprises publishing the data sharing smart contract to one or more data consumers. The method further comprises, in response to receiving a second request to access the data from a data consumer in the one or more data consumers, generating, by executing the data sharing smart contract, an indication that the data consumer is authorized to access the data. The method further comprises sending the indication to the data consumer to enable the data consumer to access the data.

In a second aspect, there is provided a method for data sharing. The method comprises determining, at a data consumer and from one or more data sharing smart contracts published by a data broker, a data sharing smart contract corresponding to data of a user to be accessed. The method further comprises sending, to the data broker, a second request to execute the data sharing smart contract for accessing the data. The method further comprises, in response to receiving an indication that the data consumer is authorized to access the data from the data broker, accessing the data of the user.

In a third aspect, there is provided a method for data sharing. The method comprises collecting data from a user. The method further comprises encrypting the data with a key. The method further comprises storing the encrypted data in a data storage server. The method further comprises sending, to a data broker, a first request to share the data of the user. The method further comprises, in response to receiving an identifier of a data sharing smart contract from the data broker, storing the key in association with the identifier of the data sharing smart contract in a key management server, the data sharing smart contract being created by the data broker for the user and indicating information on the sharing of the data.

In a fourth aspect, there is provided an electronic device which comprises at least one processor and at least one memory including computer program code. The at least one memory and the computer program code are configured to, with the at least one processor, cause the device to perform the method according to the first aspect.

In a fifth aspect, there is provided an electronic device which comprises at least one processor and at least one memory including computer program code. The at least one memory and the computer program code are configured to, with the at least one processor, cause the device to perform the method according to the second aspect.

In a sixth aspect, there is provided an electronic device which comprises at least one processor and at least one memory including computer program code. The at least one memory and the computer program code are configured to, with the at least one processor, cause the device to perform the method according to the third aspect.

In a seventh aspect, there is provided an apparatus comprising means to perform the method according to the first, second or third aspect.

In an eighth aspect, there is provided a computer readable storage medium that stores a computer program thereon. The computer program, when executed by a processor of a device, causes the device to perform the method according to the first, second or third aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As described above, in order to improve system performance and enhance user experience, some personal information of an end user (for example, user name, password, age, gender, fingerprints, telephone number, unique device identifier, location, credit card number, financial record, medical record and the like) may be collected, stored, used, maintained and/or disseminated by service providers with the authorization of the end user. However, some service providers may collect personal information which is not related to the provided services, in order to do data mining and analysis in depth to enable other services for getting more profits. Moreover, some service providers may share the collected personal information with third parties without informing related end users. All of these might threaten privacy of the end users.

Figure 1:
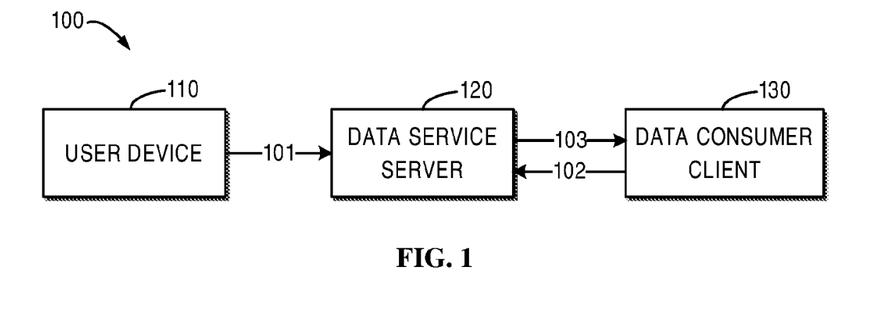
FIG. 1 illustrates a block diagram of a traditional data sharing system.

FIG. 1 illustrates a block diagram of a traditional data sharing system 100. Generally speaking, in traditional solutions, a service provider may define a data usage agreement (for example, for collecting, storing, using, disseminating and/or sharing personal data) for all of end users who want to access the provided services. An end user may have to approve the agreement in order to access the provided services, even though he/she does not satisfy with some terms and conditions in the agreement.

As shown in FIG. 1, for example, the traditional data sharing system 100 may include a user device 110, one or more data service servers 120 (also referred to as "data service server 120") and one or more data consumer clients 130 (also referred to as "data consumer 130"). The user device 110 may be any device of an end user, which can generate data, including but not limited to, a mobile phone, a wearable device, a home appliance, a sensor and so on. The data service server 120 may be managed by a service provide that provides services to the end user. The data consumer 130 may be a third party (such as, another device) or another service provider that wants to access the data from the data service server 120 for further data analysis to enable other services and/or get more profits.

While the end user is accessing services provided by the service provider, personal data of the end user may be collected from the user device 110. The collected personal data may be automatically transferred 101 to and stored at the data service server 120 managed by the service provider. Such collection of the personal data may be performed with or without authorization of the end user. The data consumer client 130 may send 102 a request to the data service server 120 to access the collected personal data. In response to the request, the data service server 120 may provide 103 the collected personal data to the data consumer client 130 without informing the ender user.

From the above traditional data sharing scenario as shown in FIG. 1, it can be seen that in traditional solutions, end users have no control of what personal data is to be collected, stored and shared. Service providers have the full control of the collected personal data. The end users do not know how their personal data is used by the service providers and/or data consumers. The end users will not be informed or notified when, who and how their personal data is used. The service providers, instead of the end users, will benefit from sharing the personal data of the end users. Moreover, it is difficult for law enforcement officers to detect if service providers violate/infringe privacy of the end users or not. The service providers and data consumers may have audit logs for the personal data usage for themselves. However, these audit logs may not be public and may be easy to be modified or tampered.

According to embodiments of the present disclosure, there is proposed a solution for data sharing. In this solution, a data broker is introduced, acting as a data transaction coordinator between end users and data consumers.

End users may collect their personal data (such as, location, medical record, and shopping record), and then encrypt the data and store the cipher text at a data storage server which may be managed by the end user or by third parties. Two collection modes can be supported for the end users to collect their personal data. One is called as pull-based data collection. That means data consumers define data collection requirements accord to their business goals. The end users may get the data collection requirements directly from the data consumers or indirectly from the data broker, and then collect their personal data accord to the requirements if they would like to share such personal data with the data consumers. The other one is called as push-based data collection. That means the end users collect their personal data and share it with others by themselves.

If an end user wants to share personal data with others, the end user may register to the data broker and then publish a corresponding smart contract on how to access the shared personal data. Data consumers may also register to the data broker and thus can get to know the data contract published by the ender user. If a data consumer wants to access the shared personal data of the end user, it may send a request to the data broker to execute the data contract. The data broker may issue an authorization token to the data consumer, such that the data consumer can access the personal data of the end user based on the authorization token. Information on the access of the data consumer may be recorded in a distributed ledger by the data broker.

Therefore, the end users can track the data usage of their personal data. Moreover, this solution enables law enforcement officers to detect if the data consumers infringe privacy of the end users when they use their personal data.

Figure 2:
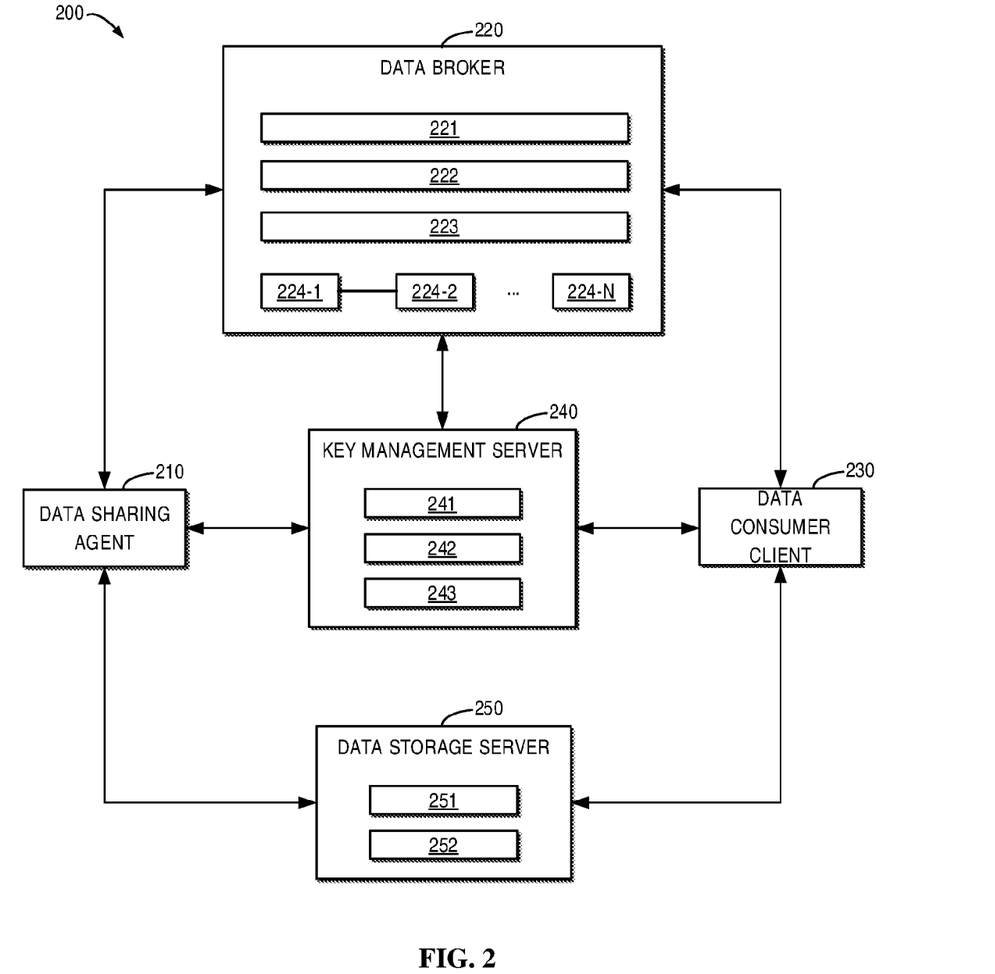
FIG. 2 illustrates a block diagram of a data sharing system according to some embodiments of the present disclosure.

FIG. 2 illustrates a block diagram of a data sharing system 200 according to some embodiments of the present disclosure. As shown in FIG. 2, in general, the data sharing system 200 includes a data sharing agent 210, a data broker 220, one or more data consumer clients 230 (also referred to as "data consumer 230" or "data consumers 230"), one or more key management servers 240 (also referred to as "key management server 240" or "key management servers 240") and one or more data storage servers 250 (also referred to as "data storage server 250" or "data storage servers 250"). It is to be understood that the structure and functionalities of the data sharing system 200 are described only for purpose of illustration without suggesting any limitation to the scope of the present disclosure. Embodiments of the present disclosure may also be applied to a different system with a different structure and/or different functionalities.

In some embodiments, the data sharing agent 210 may be deployed or implemented at a user device of an end user. For example, the user device may be any device that can generate data, including but not limited to, a mobile phone, a wearable device, a home appliance, a sensor and so on. The data sharing agent 210 may collect various data from the end user, such as raw data of personal information of the end user. Additionally, the data sharing agent 210 may be configured to further anonymize and/or desensitize the collected data of the end user. The data sharing agent 210 may encrypt the anonymized and/or desensitized data with a key, and then send the encrypted data to the data storage server 250. If the end user wants to share his/her data with others, the data sharing agent 210 may be caused to send a data sharing request (also referred to as "first request" in the following) to the data broker 220. The data broker 220 may create a corresponding data sharing smart contract for the end user in response to the first request. An identifier of the data sharing smart contract may be indicated to the data sharing agent 210. The data sharing agent 210 may store the key in association with the identifier of the data sharing smart contract in the key management server 240.

In some embodiments, the data broker 220 may be an application based on a common distributed ledger platform, which enables end users to share their personal data with data consumers securely and automatically. Alternatively, in some embodiments, the data broker 220 may be implemented as one or more devices for executing such application.

In some embodiments, the data broker 220 may include a registration management unit 221, which is configured to manage the registration of end users and data consumers. For example, the data broker 220 may derive a unique identifier of an end user or a data consumer from his/her public key optionally together with other parameters (such as, an identifier of the data broker 220, a timestamp, and so on) based on a cryptographic hash function. The end user and the data consumer may keep their respective private keys by themselves.

In some embodiments, the data broker 220 may include a smart contract management unit 222, which is configured to, in response to receiving the data sharing request from the data sharing agent 210, create a corresponding data sharing smart contract for the end user. For example, the data sharing request may indicate one or more policies defined by the end user for sharing the data. The created data sharing smart contract may describe how to access and share the data according to the one or more policies defined by the end user. In some embodiments, the policy defined by the end user may be a fine-grained policy, which indicates that the access and sharing of the data should meet some specific requirements, such as the location of the data consumer, the industry segment (for example, finance, healthcare/pharma, smart city, energy/utilities or the like) of the data consumer, the country of the data consumer, and so on. For example, some end users may set such a data sharing policy that data consumers from some regions/locations are forbidden to access their data. The created data sharing smart contract may be stored by the data broker 220 at a ledger, such as one of ledgers 224-1, 224-2 . . . 224-N (collectively referred to as "ledges 224" or individually referred to as "ledger 224") as shown in FIG. 2. For example, one ledger 224 may store one or more data sharing smart contracts and/or one or more data usage records, as will be described in the following.

In some embodiments, each data sharing smart contract may be associated with a corresponding end user. A data sharing smart contract may have its own unique identifier, which also acts as an address for executing the data sharing smart contract. The identifier of the data sharing smart contract may be derived from the public key of the end user, the address of the data in the data storage server 250 and optionally together with other parameters (such as, an identifier of the data broker 220, a timestamp, and so on) based on a cryptographic hash function. That is, the data broker 220 may not keep data of the end user, but keep the address of the data (indicating where to fetch the data) in the data sharing smart contract.

In some embodiments, the personal data of the end user may be stored as cipher text at the data storage server 250 which may be managed by the end user or managed by a third party (for example, a data service provider, a cloud service provider or the like). Optionally, the integrity verification code of the personal data may be stored in association with the encrypted personal data. The integrity verification code may be obtained from the personal data based on a cryptographic hash function and then signed with the private key of the end user.

In some embodiments, in response to determine the desired personal data to be accessed, the data consumer 230 may send, to the data broker 220, a request (also referred to "second request") to execute a corresponding data sharing smart contract for accessing the data. In response to receiving the second request from the data consumer 230, the data broker 220 (such as, the smart contract management unit 222) may execute the data sharing smart contract according to the request from the data consumer 230.

In some embodiments, the data broker 220 may also include an authorization management unit 223 as shown in FIG. 2. For example, after successful execution of the data sharing smart contract, an authorization token may be generated and issued to the data consumer 230 by the authorization management unit 223 in the data broker 220. Additionally, a corresponding data usage record, the identifier of the data sharing smart contract and the hash of authorization token may be recorded in the distributed ledger 224. The corresponding data usage record may record information on the access of the data consumer to the personal data, such as, the way in which the personal data is used, when the personal data is used, who use the personal data and so on. With the authorization token and the address of personal data optionally together with the public key of the end user (which may be used to verify the integrity of the personal data), the data consumer 230 can access the desired personal data.

The data usage records stored in the distributed ledgers 224 enable the ender users and/or law enforcement officers to track usage of the personal data. For example, the data usage records may be used to record how and when the personal data is used, as well as who use the personal data. In some embodiments, one data usage record may be kept or stored for one data consumer that executes one data sharing smart contract by one end user. As described above, one ledger 224 can store one or more data usage records and/or one or more data sharing smart contracts.

In some embodiments, each data usage record may have its own identifier, which may be derived from the identifier of a corresponding data sharing smart contract, the identifier of the data consumer and optionally together with other parameters (such as, an identifier of the data broker 220, a timestamp, and so on) based on a cryptographic hash function.

In some embodiments, the data broker 220 may get and publish personal data collection requirements (for example, data categories such as medical record and shopping record, and data attributes such as gender and age to be collected) from data consumers, which enables pull-based data collection.

In some embodiments, the data broker 220 may optimize personal data collection. For example, in order to improve system performance and maximize the value of the personal data of the end user, the data broker 220 may design a data collection form based on the requirements of the data consumer 230 and/or some potential application scenarios. The data collection form may indicate a data format in which the personal data is to be collected, such as data items, data fields, data type (e.g., String, Numeric, Date) and/or data length to be collected. Alternatively, in some embodiments, the data collection form may be designed by third parties (such as, other service providers). The data broker 220 may indicate the data collection form to the data sharing agent 210, such that the data sharing agent 210 collects data from the end user based on the data collection form. In this way, the data broker 220 may guide end users to store their personal data in a same format to one or more data storage servers, in order to facilitate the access of the stored data.

In some embodiments, the key management server 240 may include a key management unit 241, which is configured to store the identifier of the data sharing smart contract and a corresponding key for encrypting the data associated with the data sharing smart contract in storage units 243. In some embodiments, the key management server 240 may be deployed together with the data broker 220, such as, in a same physical device. The key for encrypting the data associated with the data sharing smart contract may be received from the data sharing agent 210 and provided by the end user. For example, the key may be used by the data sharing agent 210 to encrypt the anonymized and/or desensitized personal data.

In some embodiments, the encrypted personal data may be stored at the data storage server 250, which may be managed by the ender user or managed by a third party. In some cases, the data storage server that is managed by the ender user may also be referred to as "local data storage server". For example, for enterprises, they may have the capability to manage such local data storage servers. As shown in FIG. 2, for example, the data storage server 250 may include a data management unit 251 and storage units 252. For example, the data management unit 251 may be configured to receive the encrypted data from the data sharing agent 210, and store the encrypted data into the storage units 252.

In some embodiments, the key management server 240 may also include an authorization validation unit 242, which is responsible for validating the authorization token provided by the data consumer 230. For example, the authorization validation unit 242 may validate the authorization token with the help of the data broker 220. In some embodiments, the authorization token provided by the data consumer 230 may include the identifier of the data consumer 230, the identifier of the corresponding data sharing smart contract, and an address of the key management server 230. The authorization validation unit 242 may validate the authorization token by requesting the data broker 220 to check if the identifier of the data consumer 230 and the identifier of the corresponding data sharing smart contract match the corresponding data usage record in the distributed ledger 224. If the authorization validation unit 242 determines that the authorization token is valid, it may send the encryption key to the data consumer 230.

In some embodiments, in response to receiving the encryption key from the authorization validation unit 242, the data consumer 230 may send a third request for the encrypted data to the data storage server 250. The data management unit 251 in the data storage server 250 may retrieve the encrypted data from the storage units 252 and send it back to the data consumer 230. The data consumer 230 can decrypt the encrypted data obtained from the data storage server 250 with the encryption key.

In order to improve the security of personal data, the personal data may be encrypted and stored separately with the encryption key. In some embodiments, the encrypted personal data may be stored at the data storage server 250, while the encryption key may be stored at the key management server 240. For example, the data storage server 250 and the key management server 240 may be implemented in different physical devices. As such, the key management server 240 does not know the personal data even though it knows the key for encrypting the personal data, since the key management server 240 does not know the address of the personal data. Meantime, the data storage server 250 does not know the personal data either, since the data is encrypted with the key which the data storage server 250 does not know.

Figure 3:
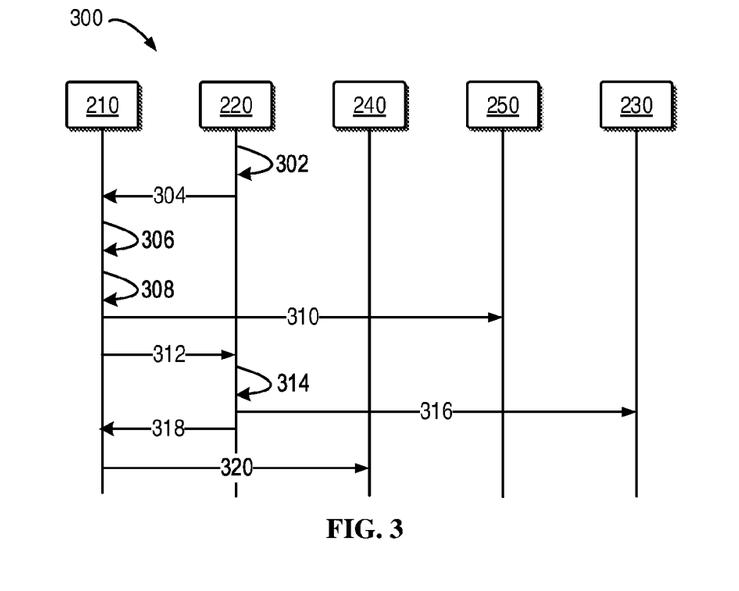
FIG. 3 shows a schematic diagram of an example process for data sharing according to some embodiments of the present disclosure.

FIG. 3 shows a schematic diagram of an example process 300 for data sharing according to some embodiments of the present disclosure. The process 300 is directed to the preparation phase for data sharing. For the purpose of discussion, the process 300 will be described with reference to FIG. 2. The process 300 may involve the data sharing agent 210, the data broker 220, the data consumer 230, the key management server 240 and the data storage server 250 as shown in FIG. 2.

As shown in FIG. 3, the data broker 220 may determine 302 a data format (that is, a data collection form, which indicates data items, data fields, data type (e.g., String, Numeric, Date) and/or data length to be collected) in which data is to be collected from an end user. For example, the data broker 220 may obtain data collection requirements from the data consumer 230 and determine the data format based on the data collection requirements. The data broker 220 may indicate 304 the data format to the data sharing agent 210. According to the data format indicated by the data broker 220, the data sharing agent 210 may collect 306 data from the end user.

In response to data being collected from the ender user, the data sharing agent 210 may anonymize and/or desensitize the collected data, and encrypt the anonymized and/or desensitized data with a key, as shown by 308 in FIG. 3. The data sharing agent 210 may then store 310 the encrypted data in the data storage server 250 securely. For example, the data sharing agent 210 may send the encrypted data to the data storage server 250 via any security mechanism currently known or to be developed in the further, such as, Transport Layer Security (TLS) protocol, IP security (IPsec) protocol or the like.

If the ender user wants to share the personal data, the data sharing agent 210 may send 312, to the data broker 220, a first request to share the data of the user. For example, the first request may include one or more of the following: a public key of the end user, data description, a data usage policy, an address of the data in the data storage server 250, and so on.

In response to receiving the first request, the data broker 220 may create 314 a data sharing smart contract for the end user and publish 316 the created data sharing smart contract to one or more data consumers (including the data consumer 230). For example, the created data sharing smart contract may describe how to access and share the data of the end user based on the policy defined by the end user. An identifier of the data sharing smart contract may be derived from the public key of the end user, the address of the data in the data storage server 250 and optionally together with other parameters (such as, an identifier of the data broker 220, a timestamp, and so on) based on a cryptographic hash function. The created data sharing smart contract may be stored in a distributed ledger 224. The data broker 220 may indicate 318 the identifier of the data sharing smart contract to the data sharing agent 210.

The data sharing agent 210 may store 320 both the identifier of the data sharing smart contract and the key for encrypting the data in the key management server 240 securely. For example, the data sharing agent 210 may send the identifier of the data sharing smart contract and the key to the key management server 240 via any security mechanism currently known or to be developed in the further, such as, TLS, IPsec or the like. The key management server 240 may keep the identifier of the data sharing smart contract in association with the encryption key securely.

As such, the data collected from the end user is ready to be access by data consumers.

Figure 4:
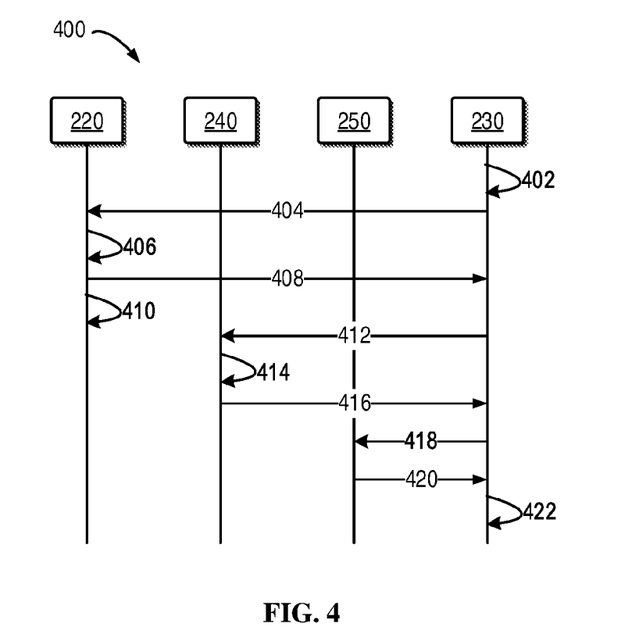
FIG. 4 shows a schematic diagram of an example process for data sharing according to some embodiments of the present disclosure.

FIG. 4 shows a schematic diagram of an example process 400 for data sharing according to some embodiments of the present disclosure. For example, the process 400 may be performed subsequent to the process 300. For the purpose of discussion, the process 400 will be described with reference to FIG. 2. The process 400 may involve the data broker 220, the data consumer 230, the key management server 240 and the data storage server 250 as shown in FIG. 2.

As shown in FIG. 4, the data consumer 230 may determine 402, from one or more data sharing smart contracts published by the data broker 220, a data sharing smart contract to be executed. The determined data sharing smart contract may correspond to data of an ender user that the data consumer 230 wants to access. The data consumer 230 may send 404, to the data broker 220, a second request to execute the data sharing smart contract for accessing the data.

In response to receiving the second request, the data broker 220 may execute the data sharing smart contract and generate an authorization indication for the data consumer 230, as shown by 406 in FIG. 4. For example, the data sharing smart contract may indicate one or more policies defined by the end user for sharing the data. The data broker 220 may determine, based on the second request, whether the access of the data consumer 230 to the data conforms to the one or more policies. If the access of the data consumer 230 conforms to the policies defined by the end user, the data broker 220 may generate an authorization token for authorizing the access of the data consumer 230. For example, the authorization token may include one or more of the following: the identifier of the data consumer 230, the identifier of the data sharing smart contract, an address of the key management server 240 and so on. In addition, the data broker 220 may derive, by executing the data sharing smart contract based on its identifier, at least one of the public key of the user and the address of the data in the data storage server 250. The data broker 220 may send 408 the authorization token, the address of the data and/or the public key of the end user (such as, used to verify the integrity of the personal data) to the data consumer 230.

The data broker 220 may record information on the access of the data consumer 230 to the data into a data usage record, and store the data usage record in a distributed ledger 224, as shown by 410 in FIG. 4. The data usage record may include one or more of the following: information on the access of the data consumer to the personal data (such as, the way in which the personal data is used, when the personal data is used, as well as who use the personal data), the identifier of the data consumer 230, the identifier of the data sharing smart contract, and a hash of the authorization token.

In response to receiving the authorization token from the data broker 220, the data consumer may send 412 the authorization token to the key management server 240 to retrieve the encryption key. The key management server 240 may validate 414 the received authorization token, for example, with the help of the data broker 220 as described above. According to the identifier of the data sharing smart contract included in the authorization token, the key management server 240 may look for the encryption key and send 416 the encryption key to the data consumer 230.

In response to receiving the encryption key from the key management server 240, the data consumer 230 may send 418 a third request for the encrypted data to the data storage server 250. The data storage server 250 may send 420 the encrypted data optionally together with the data integrity verification code of the data to the data consumer 230. The data consumer 230 may decrypt the encrypted data with the encryption key, and optionally verify the integrity of the data based on the data integrity verification code and the public key of the end user, as shown by 422 in FIG. 4.

Through the above depiction, it can be seen that embodiments of the present disclosure provide a new solution for data sharing. This solution enables low enforcement officers to detect and determine if service provides infringe end users' privacy when they use and share the personal data of the end users. This solution also enables the end users to track how their personal data is used and shared by the service providers, even though the service providers are authorized to do so. Moreover, this solution enables the end users to manage and share their personal data to get profits by themselves.

Figure 5:
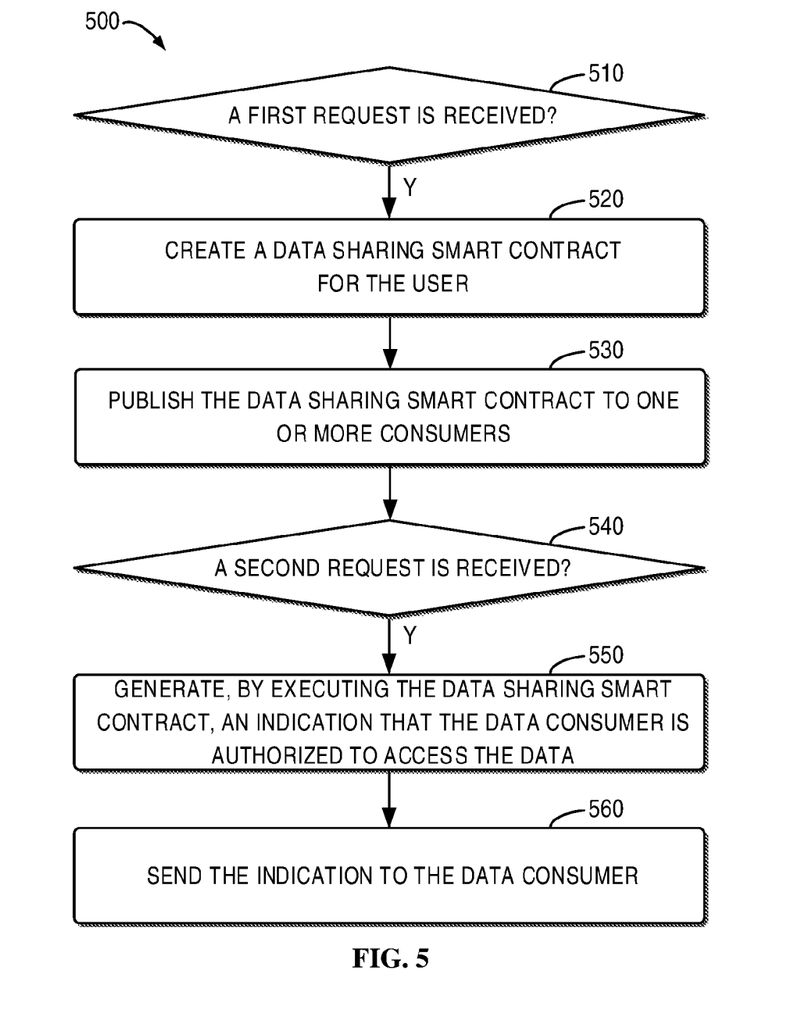
FIG. 5 shows a flowchart of an example method for data sharing according to some embodiments of the present disclosure.

FIG. 5 shows a flowchart of an example method 500 for data sharing according to some embodiments of the present disclosure. The method 500 can be implemented at the data broker 220 as shown in FIG. 2. It is to be understood that the method 500 may include additional blocks not shown and/or may omit some shown blocks, and the scope of the present disclosure is not limited in this regard.

At block 510, the data broker 220 determines whether a first request to share data of a user is received from a data sharing agent collecting the data.

In response to receiving the first request, at block 520, the data broker 220 creates a data sharing smart contract for the user, the data sharing smart contract indicating information on the sharing of the data.

In some embodiments, the first request may comprise a policy defined by the user for sharing the data. The data broker 220 may generate the data sharing smart contract based on the policy.

In some embodiments, the first request may comprise a public key of the user and an address of the date stored in a data storage server. The data broker 220 may generate, at least based on the public key and the address, an identifier of the data sharing smart contract.

In some embodiments, the data broker 220 may send the identifier of the data sharing smart contract to the data sharing agent.

At block 530, the data broker 220 publishes the data sharing smart contract to one or more data consumers.

At block 540, the data broker 220 determines whether a second request to access the data is received from one of the one or more data consumers.

In response to receiving the second request, at block 550, the data broker 220 generates, by executing the data sharing smart contract, an indication that the data consumer is authorized to access the data.

At block 560, the data broker 220 sends the indication to the data consumer to enable the data consumer to access the data.

In some embodiments, the data sharing smart contract may indicate a policy defined by the user for sharing the data. The data broker 220 may determine, based on the second request, whether the access of the data consumer to the data conforms to the policy. In response to determining that the access of the data consumer to the data conforms to the policy, the data broker 220 may generate an authorization token to authorize the data consumer to access the data. The data broker 220 may send the authorization token to the data consumer.

In some embodiments, an identifier of the data sharing smart contract may be generated at least based on a public key of the user and an address of the data stored in a data storage server. The data broker 220 may determine, by executing the data sharing smart contract based on the identifier, at least one of the public key of the user and the address of the data. The data broker 220 may send the at least one of the public key of the user and the address of the data to the data consumer.

In some embodiments, prior to block 510, the data broker 220 may determine a data format in which the data is to be collected from the user, and send an indication of the data format to the data sharing agent, such that the data sharing agent collects the data from the user in the data format.

In some embodiments, in response to the data sharing smart contract being created, the data broker 220 may store the data sharing smart contract in a distributed ledger.

In some embodiments, in response to the indication being sent to the data consumer, the data broker 220 may record information on the access of the data consumer to the data in a data usage record and store the data usage record in a distributed ledger. In some embodiments, the data broker 220 may generate, based on an identifier of the data sharing smart contract and an identifier of the data consumer, an identifier of the data usage record.

Figure 6:
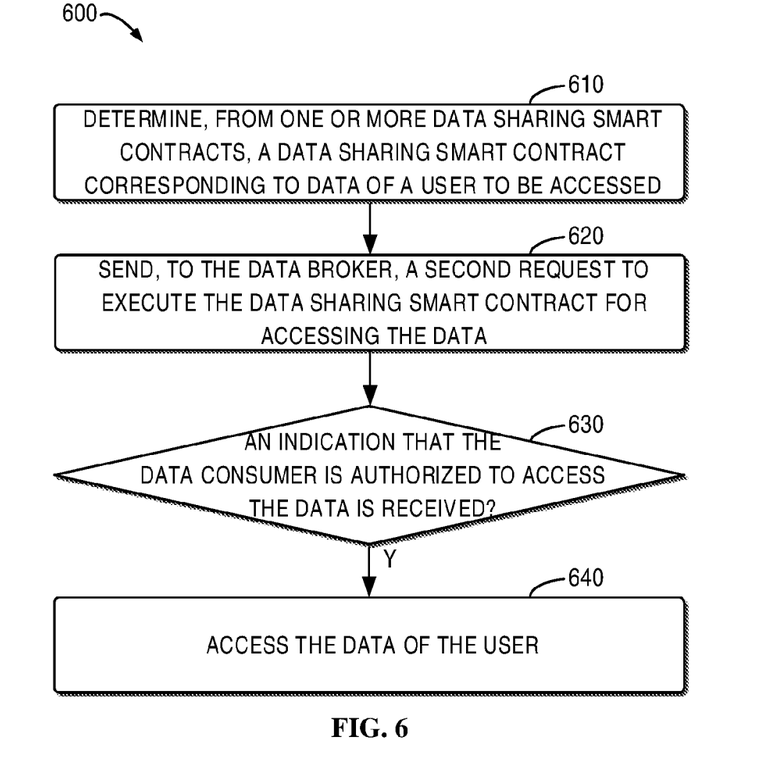
FIG. 6 shows a flowchart of an example method for data sharing according to some embodiments of the present disclosure.

FIG. 6 shows a flowchart of an example method 600 for data sharing according to some embodiments of the present disclosure. The method 600 can be implemented at the data consumer 230 as shown in FIG. 2. It is to be understood that the method 600 may include additional blocks not shown and/or may omit some shown blocks, and the scope of the present disclosure is not limited in this regard.

At block 610, the data consumer 230 determines, from one or more data sharing smart contracts published by a data broker, a data sharing smart contract corresponding to data of a user to be accessed.

In some embodiments, the data may be encrypted with a key and stored in a data storage server, and the key for encrypting the data may be stored in a key management server different from the data storage server.

At block 620, the data consumer 230 sends, to the data broker, a second request to execute the data sharing smart contract for accessing the data.

At block 630, the data consumer 230 determines whether an indication that the data consumer is authorized to access the data is received from the data broker.

In response to receiving the indication, at block 640, the data consumer 230 accesses the data of the user.

In some embodiments, the indication may comprise an authorization token to authorize the data consumer to access the data and an address of the encrypted data in the data storage server. The data consumer 230 may send the authorization token to the key management server. In response to receiving the key for encrypting the data from the key management server, the data consumer 230 may send a third request for the encrypted data to the data storage server based on the address. In response to receiving the encrypted data from the data storage server, the data consumer 230 may access the data by decrypting the encrypted data with the key.

In some embodiments, the indication may comprise a public key of the user. The data consumer 230 may obtain, from the data storage server, a verification code for verifying integrity of the data, the verification code being generated by signing a hash value of the data with a private key of the user. The data consumer 230 may verify, based on the verification code and the public key of the user, the integrity of the data.

Figure 7:
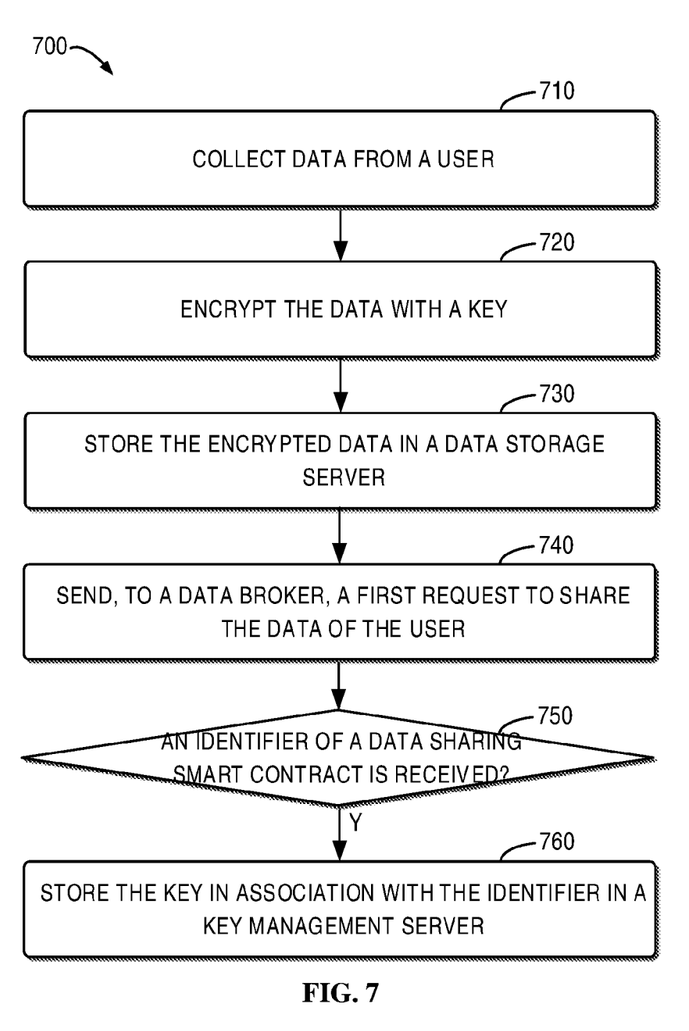
FIG. 7 shows a flowchart of an example method for data sharing according to some embodiments of the present disclosure.

FIG. 7 shows a flowchart of an example method 700 for data sharing according to some embodiments of the present disclosure. The method 700 can be implemented at the data sharing agent 210 as shown in FIG. 2. It is to be understood that the method 700 may include additional blocks not shown and/or may omit some shown blocks, and the scope of the present disclosure is not limited in this regard.

At block 710, the data sharing agent 210 collects data from a user.

At block 720, the data sharing agent 210 encrypts the data with a key.

At block 730, the data sharing agent 210 stores the encrypted data in a data storage server.

At block 740, the data sharing agent 210 sends, to a data broker, a first request to share the data of the user.

At block 750, the data sharing agent 210 determine whether an identifier of a data sharing smart contract is received from the data broker.

In response to receiving the identifier of the data sharing smart contract, at block 760, the data sharing agent 210 stores the key in association with the identifier of the data sharing smart contract in a key management server, the data sharing smart contract indicating information on the sharing of the data.

In some embodiments, the data sharing agent 210 may receive, from the data broker, an indication of a data format in which the data is to be collected. The data sharing agent 210 may collect the data from the user in the data format.

In some embodiments, prior to block 720, the data sharing agent 210 may anonymize and/or desensitize the data.

In some embodiments, the data sharing agent 210 may generate a verification code for verifying integrity of the data, and store the verification code in association with the encrypted data in the data storage server. In some embodiments, the data sharing agent 210 may generate a hash value of the data based on a cryptographic hash function, and generate the verification code by signing the hash value with a private key of the user.

In some embodiments, an apparatus capable of performing the methods 500, 600 and/or 700 may comprise means for performing the respective steps of the method s 500, 600 and/or 700. The means may be implemented in any suitable form. For example, the means may be implemented in a circuitry or software module.

In some embodiments, the apparatus capable of performing the method 500 (for example, the data broker 220) comprises: means for in response to receiving a first request to share data of a user from a data sharing agent, creating a data sharing smart contract for the user, the data sharing smart contract indicating information on the sharing of the data; means for publishing the data sharing smart contract to one or more data consumers; means for in response to receiving a second request to access the data from a data consumer in the one or more data consumers, generating, by executing the data sharing smart contract, an indication that the data consumer is authorized to access the data; and means for sending the indication to the data consumer to enable the data consumer to access the data.

In some embodiments, the apparatus capable of performing the method 600 (for example, the data consumer 230) comprises: means for determining, at a data consumer and from one or more data sharing smart contracts published by a data broker, a data sharing smart contract corresponding to data of a user to be accessed; means for sending, to the data broker, a second request to execute the data sharing smart contract for accessing the data; and means for in response to receiving an indication that the data consumer is authorized to access the data from the data broker, accessing the data of the user.

In some embodiments, the apparatus capable of performing the method 700 (for example, the data sharing agent 210) comprises: means for collecting data from a user; means for encrypting the data with a key; means for storing the encrypted data in a data storage server; means for sending, to a data broker, a first request to share the data of the user; and means for in response to receiving an identifier of a data sharing smart contract from the data broker, storing the key in association with the identifier of the data sharing smart contract in a key management server, the data sharing smart contract indicating information on the sharing of the data.

In some embodiments, the means comprises at least one processor; and at least one memory including computer program code, the at least one memory and computer program code configured to, with the at least one processor, cause the performance of the apparatus.

Figure 8:
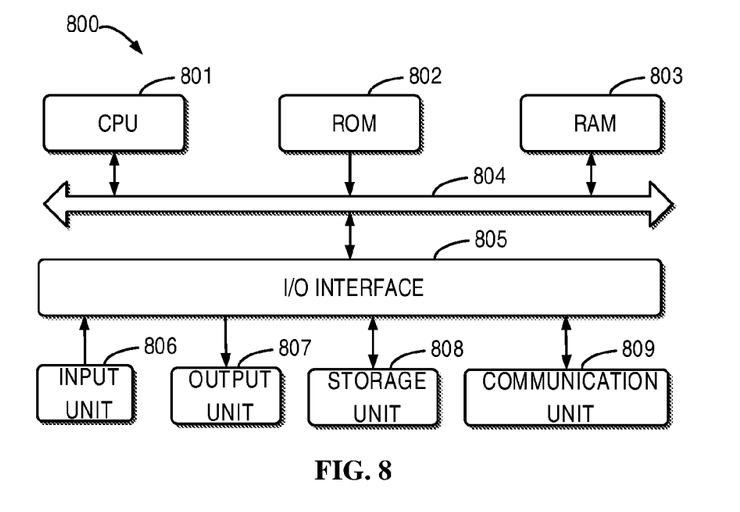
FIG. 8 is a simplified block diagram of a device that is suitable for implementing embodiments of the present disclosure.

FIG. 8 illustrates a schematic block diagram of a device 800 that can be used to implement the embodiments of the present disclosure. For example, the data sharing agent 210, the data broker 220, the data consumer 230, the key management server 240 and/or the data storage server 250 as shown in FIG. 2 can be implemented by the device 800. As shown in FIG. 8, the device 800 includes a central processing unit (CPU) 801 which may perform various appropriate actions and processing based on computer program instructions stored in the read only memory (ROM) 802 or computer program instructions uploaded from storage unit 808 to the random access memory (RAM) 803. In the RAM 803, there further stores various programs and data needed by operation of the device 800. The CPU 801, ROM 802 and RAM 803 are connected one another via a bus 804. The input/output (I/O) interface 805 is also connected to the bus 804.

The following components in the device 800 are connected to the I/O interface 805: including: an input unit 806, such as a keyboard, a mouse, and the like; an output unit 807, such as display of various types and loudspeakers; a storage unit 808, such as magnetic disk and optical disk; a communication unit 809, such as network card, modem, wireless communication transceiver. The communication unit 809 allows the device 800 to exchange data/information with other devices via computer networks, such as Internet and/or telecommunication networks.

The methods described above, such as the methods 500, 600 and/or 700, can be executed by the processing unit 801. For example, in some implementations, the methods 500, 600 and/or 700 can be implemented as a computer software program which is corporeally contained in a machine readable medium, such as the storage unit 808. In some implementations, the computer program can be partially or wholly loaded and/or mounted on the device 800 by the ROM 802 and/or the communication unit 809. When the computer program is uploaded to the RAM 803 and executed by the CPU 801, one or more steps of the methods 500, 600 and/or 700 described above can be executed.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
    at least one processor; and
    at least one memory including computer program code;
    the at least one memory and the computer program code configured to, with the at least one processor, cause the apparatus at least to:
    in response to a reception of a first request to share data of a user from a data sharing agent, create a data sharing smart contract for the user, the data sharing smart contract indicating information on the sharing of the data based on a policy defined by the user;
    publish the data sharing smart contract to one or more data consumers;
    in response to a reception of a second request to access the data from a data consumer in the one or more data consumers, generate, by an execution of the data sharing smart contract, an indication that the data consumer is authorized to access the data by determining, based on the second request, whether the access of the data consumer to the data conforms to the policy and, in response to determining that the access of the data consumer to the data conforms to the policy, generating an authorization token to authorize the data consumer to access the data; and
    send the authorization token to the data consumer to enable the data consumer to access the data.

2. The apparatus of claim 1, is further configured to cause to:
    determine a data format in which the data is to be collected from the user; and
    send an indication of the data format to the data sharing agent, such that the data sharing agent collects the data from the user in the data format.

3. The apparatus of claim 1, wherein the first request comprises a policy defined by the user for sharing the data, and wherein create the data sharing smart contract for the user further comprises:
    generate the data sharing smart contract based on the policy.

4. The apparatus of claim 1, wherein the first request comprises a public key of the user and an address of the data stored in a data storage server, and wherein create the data sharing smart contract for the user further comprises:
    generate, at least based on the public key and the address, an identifier of the data sharing smart contract.

5. The apparatus of claim 4, is further configured to cause to:
    send the identifier of the data sharing smart contract to the data sharing agent.

6. The apparatus of claim 1, wherein an identifier of the data sharing smart contract is generated at least based on a public key of the user and an address of the data stored in a data storage server,
    wherein generate the indication by executing the data sharing smart contract further comprises:
        determine, by executing the data sharing smart contract based on the identifier, at least one of the public key of the user and the address of the data; and
    wherein send the indication to the data consumer further comprises:
        send the at least one of the public key of the user and the address of the data to the data consumer.

7. The apparatus of claim 1, is further configured to cause to:
    in response to the data sharing smart contract being created, store the data sharing smart contract in a distributed ledger.

8. The apparatus of claim 1, is further configured to cause to:
    in response to the authorization token being sent to the data consumer, record information on the access of the data consumer to the data in a data usage record; and
    store the data usage record in a distributed ledger.

9. The apparatus of claim 8, wherein record the information on the access of the data consumer to the data in the data usage record further comprises:
    generate, based on an identifier of the data sharing smart contract and an identifier of the data consumer, an identifier of the data usage record.

10. An apparatus for data sharing comprising:
    at least one processor; and
    at least one memory including computer program code;
    the at least one memory and the computer program code configured to, with the at least one processor, cause the apparatus at least to:
    determine, at a data consumer and from one or more data sharing smart contracts published by a data broker, a data sharing smart contract corresponding to data of a user to be accessed;
    send, to the data broker, a second request to execute the data sharing smart contract for accessing the data; and
    in response to a reception of an indication that the data consumer is authorized to access the data from the data broker, access the data of the user,
    wherein the data is encrypted with a key and stored in a data storage server, and wherein the key for encrypting the data is stored in a key management server different from the data storage server, wherein the indication comprises an authorization token to authorize the data consumer to access the data and an address of the encrypted data in the data storage server, and wherein accessing the data further comprises:

sending the authorization token to the key management server;

in response to a reception of the key for encrypting the data from the key management server, sending a third request for the encrypted data to the data storage server based on the address; and in response to a reception of the encrypted data from the data storage server, accessing the data by decrypting the encrypted data with the key.

11. The apparatus of claim 10, wherein the indication further comprises a public key of the user, and wherein the apparatus is further configured to cause to:

obtain, from the data storage server, a verification code for verifying integrity of the data, the verification code being generated by signing a hash value of the data with a private key of the user; and verify, based on the verification code and the public key of the user, the integrity of the data.

12. An apparatus comprising:

at least one processor; and at least one memory including computer program code;

the at least one memory and the computer program code configured to, with the at least one processor, cause the apparatus at least to:

collect data from a user device;

encrypt the data with a key;

store the encrypted data in a data storage server;

send, to a data broker, a first request to share the data of the user; and in response to a reception of an identifier of a data sharing smart contract from the data broker, store the key in association with the identifier of the data sharing smart contract in a key management server, the data sharing smart contract being created by the data broker for the user and indicating information on the sharing of the data based on a policy defined by the user, wherein the sharing of the data comprises generating, by an execution of the data sharing smart contract, an indication that a data consumer is authorized to access the data by determining, by the data broker, based on a second request from a data consumer, whether the access of the data consumer to the data conforms to the policy and, in response to determining that the access of the data consumer to the data conforms to the policy, generating an authorization token to authorize the data consumer to access the data, and sending the authorization token to the data consumer to enable the data consumer to access the data.

13. The apparatus of claim 12, wherein collect the data further comprises:

receive, from the data broker, an indication of a data format in which the data is to be collected; and collect the data from the user in the data format.

14. The apparatus of claim 12, is further configured to cause to:

prior to encrypting the data with the key, anonymize and/or desensitize the data.

15. The apparatus of claim 12, is further configured to cause to:

generate a verification code for verifying integrity of the data; and store the verification code in association with the encrypted data in the data storage server.

16. The apparatus of claim 15, wherein generate the verification code further comprises:

generate, based on a cryptographic hash function, a hash value of the data; and generate the verification code by signing the hash value with a private key of the user.

\* \* \* \* \*